United States Patent
Tsujii

(10) Patent No.: US 8,456,533 B2
(45) Date of Patent: Jun. 4, 2013

(54) IMAGE CAPTURING APPARATUS AND CONTROL METHOD OF THE SAME

(75) Inventor: Hideaki Tsujii, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/214,701

(22) Filed: Aug. 22, 2011

(65) Prior Publication Data
US 2012/0050568 A1    Mar. 1, 2012

(30) Foreign Application Priority Data

Aug. 25, 2010    (JP) ................ 2010-188750

(51) Int. Cl.
*H04N 5/225* (2006.01)

(52) U.S. Cl.
USPC .............. 348/207.1; 348/207.11; 348/211.99; 348/211.1; 348/211.2

(58) Field of Classification Search
USPC ................ 348/207.1, 207.11, 211.99, 211.1, 348/211.2, 211.3
See application file for complete search history.

(56) References Cited

U.S. PATENT DOCUMENTS
2010/0265351 A1*  10/2010  Kaibara ................ 348/222.1

FOREIGN PATENT DOCUMENTS
JP     2009-020876       1/2009

* cited by examiner

*Primary Examiner* — Yogesh Aggarwal
(74) *Attorney, Agent, or Firm* — Cowan, Liebowitz & Latman, P.C.

(57) ABSTRACT

In the case where an automatic transferable recording medium has been detected, the naming rule is changed to a naming rule according to which a filename having the next number after a number given to an image file that was recorded last time is generated, out of a plurality of selectable naming rules for generating a filename to be given to an image that is to be newly recorded.

4 Claims, 4 Drawing Sheets

IMAGE CAPTURING APPARATUS AND CONTROL METHOD OF THE SAME

BACKGROUND OF THE INVENTION

1. Field of the Invention

The present invention relates to a technique for generating a filename of an image file.

2. Description of the Related Art

An image file captured by an image capturing apparatus such as a digital camera is recorded in a recording medium connected to the image capturing apparatus, and, for example, a user connects the recording medium to an external apparatus such as a PC and moves the recorded image file to the external apparatus, thereby managing the captured image file. Recent recording media that are connected to such an image capturing apparatus and used include an automatic transferable recording medium that has a wireless communication unit and is capable of automatically transferring image files to an external apparatus.

However, since such an automatic transferable recording medium automatically transfers the recorded image file to the external apparatus without changing the filename of the image file, there have been problems as described below. That is to say, there were cases where, for example, when an image file having the same filename as the image file to be transferred was present in a storage destination of image files in the external apparatus, the image file could not be transferred, or the existing image file was overwritten. Japanese Patent Laid-Open No. 2009-020876 discloses a technique in which when a file having the same filename is present in a transfer destination directory as described above, overwriting of the file is avoided by creating a new directory.

However, it is conceivable that if a method, such as disclosed in Japanese Patent Laid-Open No. 2009-020876, in which a new directory is created every time there is a file having the same filename in the transfer destination is used, a large number of directories unintended by the user are created. That is to say, it is necessary for the user to refer to a plurality of directories in order to search for the transferred file, and there were cases where the user was required to do a troublesome operation.

SUMMARY OF THE INVENTION

The present invention has been made in view of problems of conventional techniques such as those described above. The present invention provides a technique for preventing a situation in which when transferring an image file from an automatic transferable recording medium, the presence of an image file having the same filename makes the transfer impossible or results in overwriting.

The present invention in its first aspect provides an image capturing apparatus comprising: a detection unit configured to detect that a recording medium has been connected; a determination unit configured to determine whether or not the recording medium detected by the detection unit is an automatic transferable recording medium that automatically transfers an image file recorded in the recording medium to an external apparatus by wireless communication; an image capturing unit configured to capture an image of a subject and output the image; a selection unit configured to receive an input from a user to select which naming rule is used to generate a filename of the image output by the image capturing unit, out of a plurality of naming rules including a first naming rule according to which a filename having a next number after a number given to an image file that was recorded last time is generated; a generation unit configured to generate a filename of the image according to the naming rule selected by the selection unit; a control unit configured to perform control so as to cause the generation unit to generate the filename according to the first naming rule if the determination unit has determined that the recording medium is the automatic transferable recording medium; and a recording unit configured to record the image in the recording medium as an image file with the filename generated by the generation unit.

Further features of the present invention will become apparent from the following description of exemplary embodiments with reference to the attached drawings.

DESCRIPTION OF THE EMBODIMENTS

Embodiment 1

Figure 1:
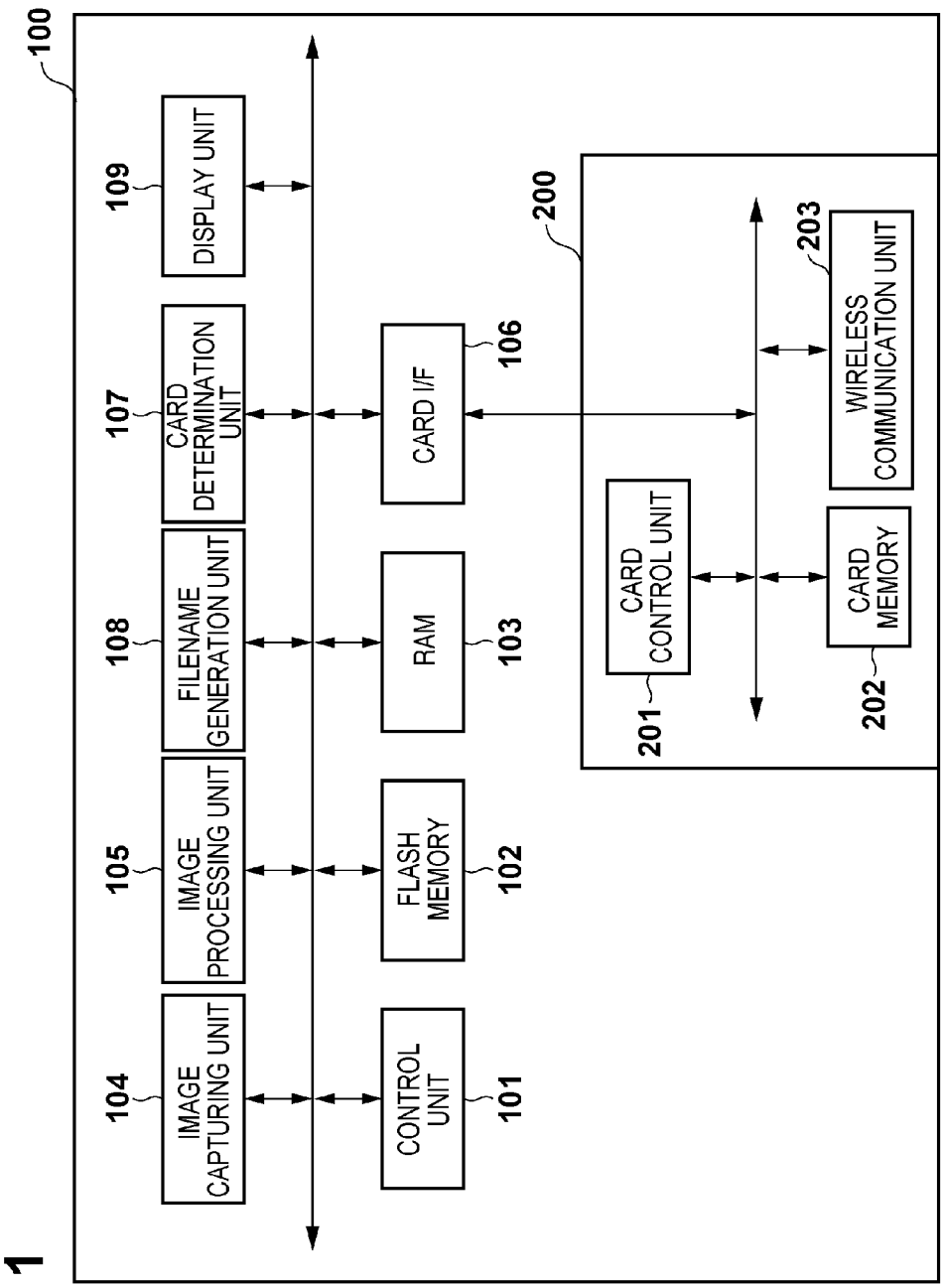
FIG. 1 is a block diagram showing functional configurations of a digital camera and an automatic transferrable memory card according to an embodiment of the present invention.

Hereinafter, a illustrated embodiment of the present invention will be described in detail with reference to the drawings. It should be note that in the embodiment below, an example in which the present invention is applied to a digital camera, serving as an example of an image capturing apparatus, that is capable of selecting any of a plurality of naming rules regarding filenames to be given to the image files, and that is capable of determining a recording medium having an automatic transfer function will be described. However, the present invention is applicable to any device that is capable of selecting any of a plurality of naming rules and is capable of determining a recording medium having the automatic transfer function.

Moreover, in each embodiment, a "naming rule" refers to a rule that conforms to the DCF standard (Design rule for Camera File system) of the Japan Electronic Industrial Development Association (JEIDA) and that is used in generating a filename to be given to an image file. It should be noted that, according to the DCF standard, directory names and filenames contain a character string and a multi-digit number, and that captured image files can be independently recorded without overwriting, by controlling the numbers given to directory names and filenames to be generated. Moreover, the DCF standard defines the number of digits in the number and the length of the character string to be contained in filenames, and although there is no provision regarding the order in which the numbers are generated, in a common digital camera, the numbers are sequentially given in ascending order in light of the simplification of algorithms and the sort order of files.

It is assumed that when using the digital camera of the present embodiment, the user can switch between two types of naming rules, "sequential serial number" and "auto reset", which are naming rules conforming to the DCF standard. According to the sequential serial number naming rule (a first naming rule), the digital camera stores the number contained in the filename given to the image file that was recorded last time and generates a filename containing the next number after the stored number for an image file to be newly recorded. According to the auto reset naming rule (a second naming rule), the digital camera retrieves filenames given to image files recorded in a recording medium, such as a memory card, connected to the digital camera from the recording medium. Then, the digital camera generates a filename having the next number after the largest number in the filenames of the image files recorded in the recording medium. With either naming rule, when a file number contained in a filename to be given to an image file has exceeded a predetermined maximum value, a directory provided with the next number after a directory number contained in a directory name of a directory in which the image files are currently being recorded is newly created. Then, the image file is provided with a filename having a predetermined minimum file number value and recorded in the newly created directory. It should be noted that, although the digital camera of the present embodiment is described as being capable of switching between the two naming rules, the implementation of the present invention is not limited to this, and a configuration in which one naming rule can be selected from a plurality of naming rules including at least the sequential serial number naming rule can be adopted.

FIG. 1 is a block diagram showing a functional configuration of a digital camera 100 according to an embodiment of the present invention.

A control unit 101 is, for example, a CPU and reads out an operation program of each block included in the digital camera 100 from a flash memory 102, expands, and executes the operation program in a RAM 103, thereby controlling the operation of each block included in the digital camera 100. The flash memory 102 is a rewritable non-volatile memory and stores setting values that are necessary for the operation of each block and GUI data and the like to be displayed on a display unit 109 (described later) as well as the operation program of each block included in the digital camera 100. The RAM 103 is a rewritable volatile memory and is used as a temporary data storage or a work area during the operation of each block included in the digital camera 100. In the present invention, it is assumed that data of an image before being provided with a filename is temporarily stored in the RAM 103, and is provided with the filename and recorded as an image file, when being recorded in the connected recording medium.

An image capturing unit 104 is a block including an optical system, an image sensing device such as a CCD or a CMOS sensor, and an A/D conversion circuit. Specifically, in the image capturing unit 104, an optical image of a subject that has been imaged via the optical system is photo-electrically converted by the image sensing device to output an analog image signal, which in turn is A/D converted by the A/D conversion circuit to output digital image data, and the digital image data is stored in the RAM 103. An image processing unit 105 applies predetermined image processing such as tone correction and gain adjustment to the digital image data output from the image capturing unit 104, and furthermore, encodes the image data into an encoding scheme that has been preset as a recording format and stores the encoded image data in the RAM 103 again.

A card I/F 106 is an input/output interface, which is included in the digital camera 100, for reading and writing data from and to a recording medium. It is assumed that a recording apparatus such as a memory card or an HDD is removably connected to the card I/F 106, and once the card I/F 106 has detected that a recording medium is connected thereto, the card I/F transmits the detection of the recording medium to the control unit 101. A card determination unit 107, in response to the detection of the recording medium, determines whether or not the recording medium connected to the card I/F 106 is an automatic transferable recording medium including a wireless communication unit. Specifically, it is assumed that, for example, the card determination unit 107 sends a command signal for determining the card type in conformity with a predetermined protocol to the detected recording medium, and if a predetermined response signal is received, the card determination unit can recognize that the connected recording medium is an automatic transferable recording medium.

Figure 3A:
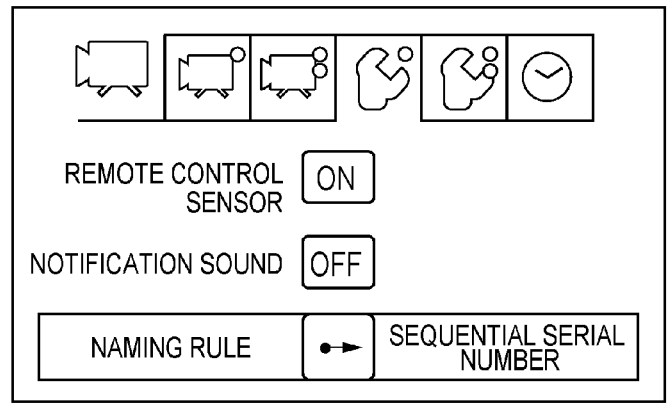
FIGS. 3A, 3B, and 3C are diagrams for explaining GUIs for changing the naming rule according to the embodiment.
Figure 3B:
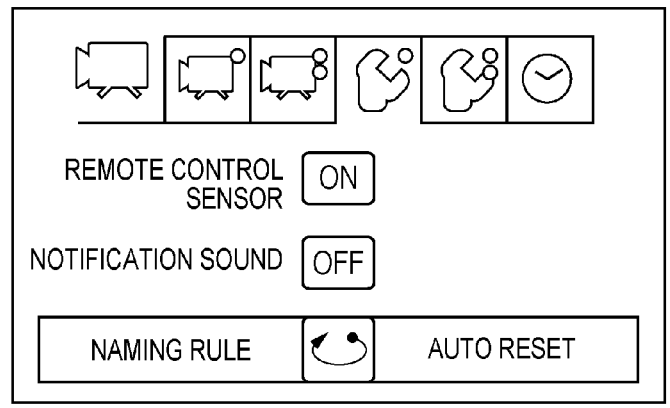

The display unit 109 is a display apparatus, such as a small LCD, included in the digital camera 100 and displays image data output from the image capturing unit 104, image files recorded in the recording medium, and the GUI data and the like stored in the flash memory 102. A filename generation unit 108 is a block that is included in the digital camera 100 and decides on a filename to be given to image data to be recorded. With the digital camera 100 of the present embodiment, the user can select the above-described two naming rules, "sequential serial number" and "auto reset", and the filename generation unit 108 generates a filename to be given to image data according to the selected naming rule. Naming rule selection can be performed by, for example, causing the display unit 109 to display GUI data of a menu screen such as those shown in FIGS. 3A to 3C and allowing the user to perform the selection. FIGS. 3A and 3B illustrate display when the "sequential serial number" naming rule and the "auto reset" naming rule, respectively, are selected. It should be noted that information on the currently selected naming rule can be stored in, for example, the flash memory 102, and when the digital camera 100 is activated, the control unit 101 can read out and transmit the information on the currently selected naming rule to the filename generation unit 108.

Moreover, in the block diagram of the digital camera 100 in FIG. 1, a configuration in which a recording medium (an automatic transferrable memory card) 200 having the automatic transfer function is connected is shown. The automatic transferrable memory card 200 includes a card control unit 201, a card memory 202, and a wireless communication unit 203. The card control unit 201 is a block that controls the operation of each block included in the automatic transferrable memory card 200. It should be noted that the card control unit 201, upon receipt of the command signal for determining the card type in conformity with the predetermined protocol from the digital camera 100, sends a response signal indicating that the connected recording medium is an automatic transfrable recording medium to the digital camera 100. The card memory 202 is, for example, a NAND flash memory device, and data such as an image file can be recorded therein. The card control unit 201, upon receipt of an image file along with a write command from the digital camera 100, writes the image file to the card memory 202. The wireless communication unit 203 is, for example, an RF circuit, and when the automatic transferrable memory card 200 is in an environment where wireless communication can be performed in a state in which the memory card is connected to the digital camera 100, this unit sends an image file stored in the card memory 202 while maintaining the filename as is. The image file sent by the wireless communication unit 203 is stored in a predetermined storage destination in an external apparatus.

Naming Rule Decision Process

Figure 2:
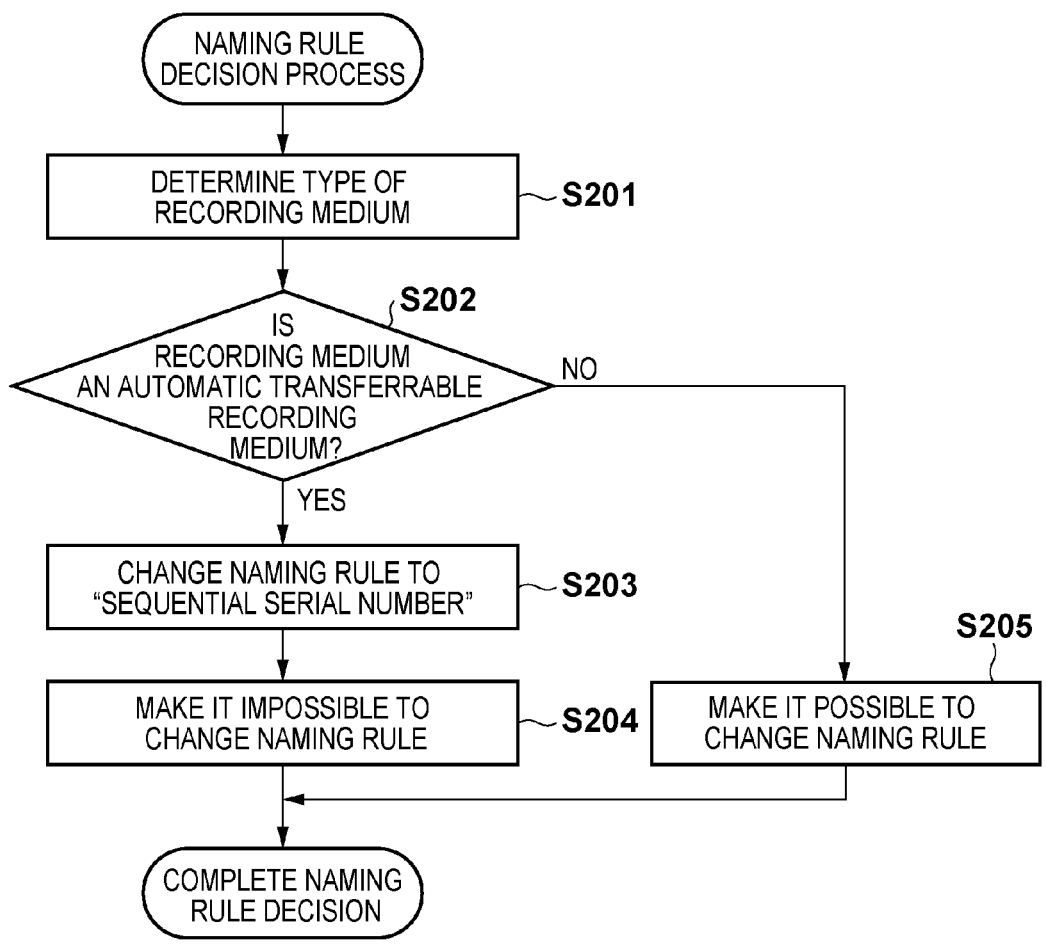
FIG. 2 is a flowchart of a naming rule decision process according to Embodiment 1.

With regard to a naming rule decision process of the digital camera 100 of the present embodiment having a configuration such as described above, specific processing will be described using the flowchart in FIG. 2. The processing corresponding to this flowchart can be realized by the control unit 101, for example, reading out a corresponding processing program stored in the flash memory 102, expanding, and executing the program in the RAM 103. It should be noted that in the following description, it is assumed that this naming rule decision process is started when, for example, the card I/F 106 has detected that a recording medium is newly connected to the digital camera 100.

In step S201, the control unit 101 determines the type of the recording medium that has been detected. Specifically, the control unit 101 causes the card determination unit 107 to send a command signal for determining the card type to the detected recording medium via the card I/F 106. Then, in step S202, the control unit 101 advances the processing to step S203 if the detected recording medium is an automatic transferable recording medium, and advances the processing to step S205 if the detected recording medium is not an automatic transferable recording medium.

Figure 3C:
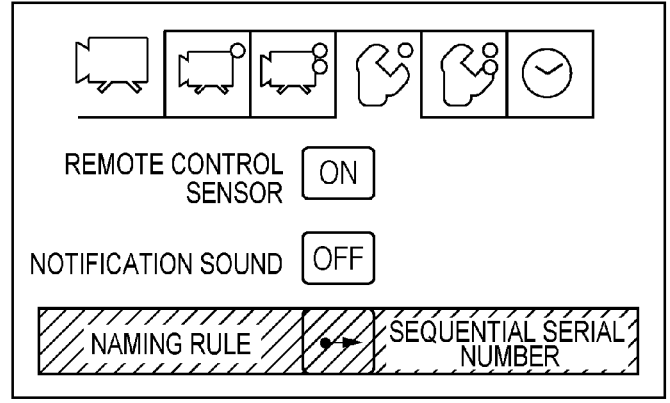

In step S203, the control unit 101 sets the image file naming rule to "sequential serial number (the first naming rule)", and furthermore, in step S204, makes it impossible to change the naming rule to a naming rule other than the first naming rule. Specifically, the control unit 101 rewrites information on the currently selected naming rule, which is stored in the flash memory 102, to "sequential serial number" and also sets the naming rule setting in the filename generation unit 108 to "sequential serial number". Moreover, the control unit 101, for example, grays out a naming rule item in GUI data of a menu screen that is displayed on the display unit 109 and that prompts the user to set the naming rule, as shown in FIG. 3C, to make it impossible to select the naming rule item, thereby making it impossible to change the naming rule. It should be noted that if the detected recording medium is not an automatic transferable recording medium, the control unit 101 makes it possible to change the naming rule in step S205.

As described above, the image capturing apparatus of the present embodiment can prevent a situation in which, when the automatic transferable recording medium transfers a recorded image file to an external apparatus, the presence of an image file having the same filename makes the transfer impossible or results in overwriting of the image file. Specifically, when an automatic transferable recording medium has been detected, the image capturing apparatus changes the naming rule to a naming rule according to which a filename having the next number after a number given to an image file that was recorded last time is generated, out of a plurality of selectable naming rules for generating a filename to be given to a newly recorded image.

In this manner, in the case where an automatic transferable recording medium has been connected, the image file naming rule is set to "sequential serial number". This makes it possible to at least prevent the generation of an image file having the same filename in the automatic transferable recording medium. That is to say, when an image file is automatically transferred to the external apparatus, it is possible to at least avoid a situation in which the transfer cannot be performed or overwriting of an image file occurs due to an image file that has already been transferred from the automatic transferable recording medium.

Embodiment 2

In the description of Embodiment 1 above, it has been assumed that the automatic transferable recording medium merely transfers a recorded image file to an external apparatus. However, an automatic transferable recording medium of the present embodiment further has the following function. The automatic transferable recording medium of the present embodiment assumes that in the external apparatus, image files are automatically sorted into directories in which the image files are to be stored, according to the time when the image files were captured (e.g. capturing date, capture month, capturing time of day, or the like).

In the case where the directory in which an image file is to be stored is changed according to the time when the image file was captured in this manner, a problem as described below occurs with a filename naming rule conforming to the DCF standard. For example, when a file number contained in a filename given to an image file has reached the maximum value in the automatic transferable recording medium, new filenames beginning from the minimum file number value are sequentially generated and recorded in a directory having the next directory number. At this time, a situation may arise in which in a directory in the external apparatus to which image files are automatically transferred and stored, the order of file numbers contained in filenames of the image files differs from the order in which the image files were captured. That is to say, even though it is originally set that the file numbers are given in ascending order, the image files arranged in filename order will not be in time series order, and therefore the user is required to give consideration to the sort order in order to search for a desired image file.

In order to avoid such a situation, for example, in the case where the directory in which image files are stored in the external apparatus is changed for each capturing date, every time the capturing date changes, a file number contained in a filename generated according to the naming rule is changed to a predetermined number. That is to say, in the image capturing apparatus of the present embodiment, when the storage destination directory is changed, file numbers contained in filenames of image files to be recorded in the automatic transferable recording medium are started from a value that is smaller than the maximum file number value. It should be noted that the predetermined number can be any number as long as the number of available numbers between the predetermined number and the maximum file number value allows the number of image files that could be recorded on, for example, the same capturing date in the present embodiment. Thus, in the storage destination directory, the image files can be stored in such a manner that when the image files are arranged in time series order, the image files are arranged in the order of the file numbers contained in the filenames. Ultimately, the possibility that the time series order may differ from the filename order in the storage destination directory can be minimized by setting a starting value of file numbers contained in filenames to the minimum value of the file numbers when the storage destination directory is changed.

However, as a result of changing the file number to the predetermined number when the storage destination directory is changed, there are cases where image files having the same filename are recorded in a directory in which image files are recorded in the automatic transferable recording medium. To address this issue, the image capturing apparatus of the present embodiment also changes the directory in which image files are to be recorded in the automatic transferable recording medium at the timing when the directory in which image files are to be stored in the external apparatus is changed. This makes it possible to set the order of file numbers to time series order while preventing a situation in which the presence of an image file having the same filename in an external apparatus serving as the automatic transfer destination makes the transfer impossible or results in overwriting of the file.

File Recording Process

Figure 4:
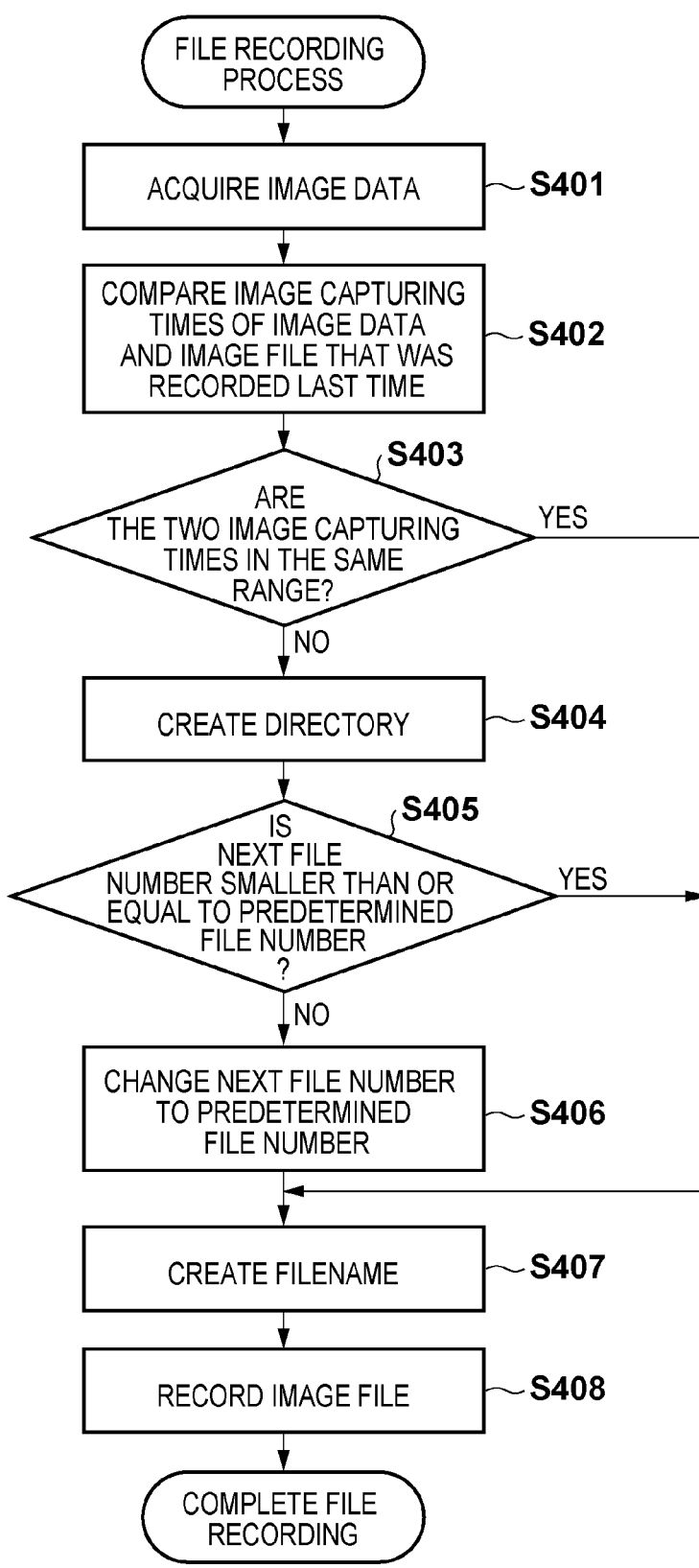
FIG. 4 is a flowchart of a file recording process according to Embodiment 2.

Specific processing of a file recording process of the digital camera 100 of the present embodiment having a configuration such as described above will be described using the flowchart in FIG. 4. The processing corresponding to this flowchart can be realized by the control unit 101, for example, reading out a corresponding processing program stored in the flash memory 102, expanding, and executing the program in the RAM 103. It should be noted that in the following description, it is assumed that this file recording process is started when, for example, an automatic transferable recording medium has been connected to the digital camera 100 and an instruction to store a captured image has been provided by the user. It should be noted that, in the present embodiment as well, it is assumed that the digital camera 100 sets the filename naming rule to "sequential serial number" when an automatic transferable recording medium has been detected, as in Embodiment 1 above. Moreover, in the present embodiment, it is assumed that image files recorded in the automatic transferable recording medium are sorted and stored in different directories for each capturing date in an external apparatus serving as the automatic transfer destination.

In step S401, the control unit 101 acquires a target image of a recording instruction provided by the user and stores the image in, for example, the RAM 103. Specifically, the control unit 101 acquires image data that has been captured by the image capturing unit 104 and output after being converted into a predetermined recording format by the image processing unit 105, and stores the image data in the RAM 103.

In step S402, the control unit 101 compares information on the capturing time that indicates the time at which the captured image data was output in step S401 with information on the capturing time of an image file that was recorded last time. Then, in step S403, the control unit 101 advances the processing to step S407 if the two pieces of information on the capturing time are in the same time range, and advances the processing to step S404 if the two pieces of information are in different time ranges. Specifically, the control unit 101 judges whether or not the two pieces of information on the capturing time indicate the same capturing date. It should be noted that the information on the capturing time of the image file that was recorded last time can be, for example, stored in the flash memory 102 along with the file number contained in the filename of the image file that was recorded last time.

In step S404, the control unit 101 creates a directory in the automatic transferable recording medium that is different from the directory in which the image file that was recorded last time is recorded. It should be noted that in the present embodiment, the directory name of the newly created directory conforms to the DCF standard. That is to say, for example, in the case where the directory name of the directory in which the image file that was recorded last time is recorded has a maximum directory number value of 999, a directory with a directory name having a minimum directory number value of 100 can be generated. It should be noted that at this time, in the case where a directory having the same directory name is already present in the automatic transferable recording medium, the directory name of the existing directory can be changed.

In step S405, the control unit 101 judges whether or not a file number contained in a filename to be given to the image data that was stored in the RAM 103 in step S401 and that is to be recorded in the newly created directory is smaller than or equal to a predetermined file number. As described above, the digital camera 100 of the present embodiment ensures that the file number order and the time series order are identical with each other in the storage destination directory in the external apparatus to which image data is transferred by the automatic transferable recording medium. Therefore, the predetermined file number can be any number as long as the number of available numbers between the predetermined number and the maximum file number value allows the number of image files that could be recorded on, for example, the same capturing date in the present embodiment. That is to say, the predetermined file number may be a value that varies according to the conditions under which the storage destination of image files is changed in the external apparatus.

The control unit 101 advances the processing to step S406 if the file number contained in the filename to be given to the image file that was stored in the RAM 103 in step S401 is larger than the predetermined file number. That is to say, the control unit 101 judges whether or not the next number after the file number contained in the filename of the last image file stored in the RAM 103 is larger than the predetermined file number. The control unit 101 advances the processing to step S407 if the file number contained in the filename to be generated by the filename generation unit 108 is smaller than or equal to the predetermined file number.

In step S406, the control unit 101 changes the file number contained in the filename of the image file that was recorded last time and that is stored in the RAM 103 to the number before the predetermined number and stores the number. That is to say, the control unit 101 changes information on the file number contained in the filename of the image file that was recorded last time so that the filename to be generated by the filename generation unit 108 next has the predetermined number.

In step S407, the control unit 101 causes the filename generation unit 108 to generate the filename to be given to the image data that was stored in the RAM 103 in step S401. Specifically, the control unit 101 transmits information on the file number contained in the filename given to the image file that was recorded last time and that is stored in the RAM 103 to the filename generation unit 108, and causes the filename generation unit 108 to generate a filename according to the "sequential serial number" naming rule.

In step S408, the control unit 101 gives the filename that has been generated by the filename generation unit 108 in step S407 to the image data stored in the RAM 103, and records the image data in the automatic transferrable memory card 200 as an image file via the card I/F 106.

In this manner, it is possible to set the order of file numbers to the time series order, while preventing a situation in which in an external apparatus serving as the automatic transfer destination, the presence of an image file having the same filename makes the transfer impossible or results in overwriting of the file.

It should be noted that, in Embodiments 1 and 2 above, it has been described that it is possible to at least avoid a situation in which when an image file is transferred from an automatic transferable recording medium to an external apparatus, the transfer cannot be performed or overwriting of an image file occurs due to an image file that has already been transferred from the automatic transferable recording medium. The present invention further provides the following effect by differentiating the character string contained in filenames in the case where a recording medium connected to the image capturing apparatus is an automatic transferable recording medium from that in the case where the recording medium is another type of recording media. That is to say, it is possible to avoid such a situation as overwriting of an image file, which arises because an image file transferred from the automatic transferable recording medium to the external apparatus has the same filename as an image file that has already been transferred.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-188750, filed Aug. 25, 2010, which is hereby incorporated by reference herein in its entirety.

What is claimed is:

1. An image capturing apparatus comprising:
a detection unit configured to detect that a recording medium has been connected;
a determination unit configured to determine whether or not the recording medium detected by the detection unit is an automatic transferable recording medium that automatically transfers an image file recorded in the recording medium to an external apparatus by wireless communication;
an image capturing unit configured to capture an image of a subject and output the image;
a selection unit configured to receive an input from a user to select which naming rule is used to generate a filename of the image output by the image capturing unit, out of a plurality of naming rules including a first naming rule and a second naming rule, wherein a filename according to the first naming rule having a next number after a number given to an image file that was recorded last time is generated and a filename according to the second naming rule having a next number after a largest number among numbers contained in filenames of image files recorded in the recording medium is generated;
a generation unit configured to generate a filename of the image according to the naming rule selected by the selection unit;
a control unit configured to control so as to cause the generation unit to generate the filename according to the first naming rule if the determination unit has determined that the recording medium is the automatic transferable recording medium, and to control so as to cause the generation unit to generate the filename according to a naming rule selected among the first naming rule and the second naming rule by the selection unit if the determination unit has determined that the recording medium is not the automatic transferable recording medium; and
a recording unit configured to record the image in the recording medium as an image file with the filename generated by the generation unit.

2. The image capturing apparatus according to claim 1, wherein the external apparatus is configured to record image files automatically transferred from the automatic transferable recording medium in different directories for each time range in which the image files are captured, and
if the determination unit has determined that the recording medium is the automatic transferable recording medium, and if the capturing time of a new image output by the image capturing unit and the capturing time of the image file that was recorded in the automatic transferable recording medium last time are in different time ranges,
the generation unit generates the filename to be generated according to the first naming rule so as to have a predetermined number that is smaller than a number contained in the filename of the image file that was recorded last time, and
the recording unit creates a new directory in the automatic transferable recording medium, and records the new image in the new directory, with the filename having the predetermined number generated by the generation unit.

3. The image capturing apparatus according to claim 2, wherein the predetermined number is a smallest number that can be contained in the filename.

4. A control method of an image capturing apparatus, the method comprising the steps of:
detecting that a recording medium has been connected;
determining whether or not the recording medium detected in the detection step is an automatic transferable recording medium that automatically transfers an image file recorded in the recording medium to an external apparatus by wireless communication;
capturing an image of a subject and outputting the image;
receiving an input from a user to select which naming rule is used to generate a filename of the image output in the image capturing step, out of a plurality of naming rules including a first naming rule and a second naming rule, wherein a filename according to the first naming rule having a next number after a number given to an image file that was recorded last time is generated and a filename according to the second naming rule having a next number after a largest number among numbers contained in filenames of image files recorded in the recording medium is generated;
generating a filename of the image according to the selected naming rule;
controlling in such a manner that if it has been determined in the determination step that the recording medium is the automatic transferable recording medium, the filename is generated according to the first naming rule in the generation step, and controlling so as to cause the generating step to generate the filename according to a naming rule selected among the first naming rule and the second naming rule by the user if was determined that the recording medium is not the automatic transferable recording medium; and
recording the image in the recording medium as an image file with the filename generated in the generation step.

* * * * *